Nov. 16, 1926.

O. W. JOHNSON 1,607,401

AUTOMATIC MACHINE FOR FORMING WIRE PRODUCTS

Filed Feb. 18, 1924    4 Sheets-Sheet 1

INVENTOR
Otto W. Johnson
BY
M. C. Frank
ATTORNEY

Nov. 16, 1926. 1,607,401
O. W. JOHNSON
AUTOMATIC MACHINE FOR FORMING WIRE PRODUCTS
Filed Feb. 18, 1924 4 Sheets-Sheet 2

INVENTOR
Otto W. Johnson
BY
M. C. Frank
ATTORNEY

Nov. 16, 1926.
O. W. JOHNSON
1,607,401
AUTOMATIC MACHINE FOR FORMING WIRE PRODUCTS
Filed Feb. 18, 1924    4 Sheets-Sheet 4
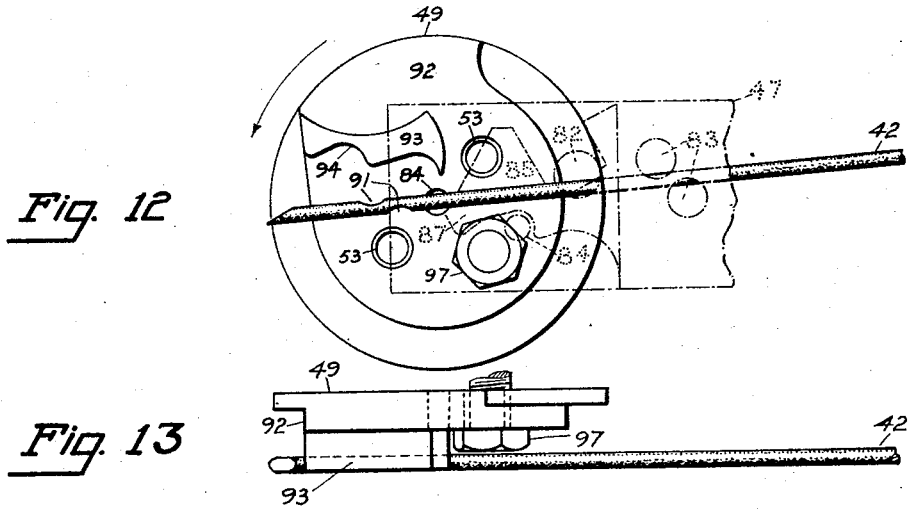
Fig. 12
Fig. 13
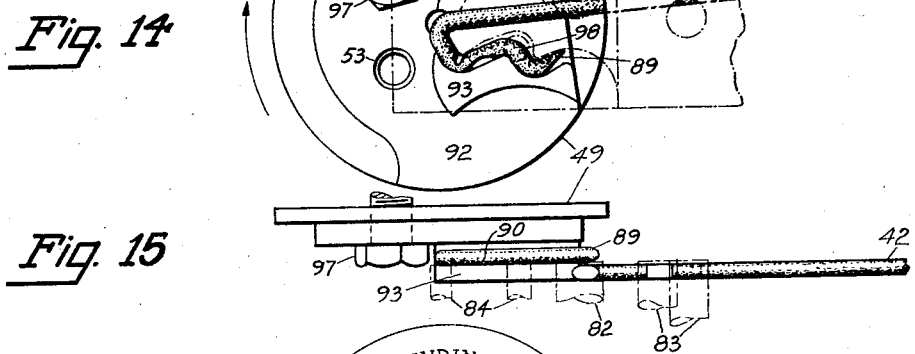
Fig. 14
Fig. 15
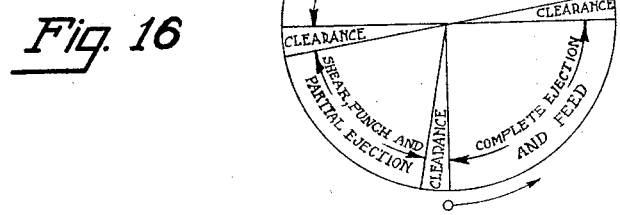
Fig. 16
INVENTOR
Otto W. Johnson
BY M. C. Frank
ATTORNEY Patented Nov. 16, 1926.

1,607,401

UNITED STATES PATENT OFFICE.

OTTO W. JOHNSON, OF OAKLAND, CALIFORNIA, ASSIGNOR OF ONE-HALF TO FRED STARR, OF OAKLAND, CALIFORNIA.

AUTOMATIC MACHINE FOR FORMING WIRE PRODUCTS.

Application filed February 18, 1924. Serial No. 693,436.

This invention relates to automatic machines for forming wire products, and more particularly to machines for shaping and producing fastening devices for metal lath construction; such as described and claimed in my co-pending application Serial Number 637,803, filed May 9th, 1923.

The principal object of this invention is the provision of an automatic machine, simple in construction, efficient and positive in operation, durable in use, and capable of producing wire products in quantity at high speed and with but little consumption of power.

Another object is to produce an automatic machine constructed in accordance with this invention having a positive and automatic wire feeding mechanism, a simple bending and shaping die mechanism, and a combined shearing and ejector mechanism for the finished product.

Another object is to accomplish the above operations by new and novel mechanical movements incorporated in the machine.

A further object is to construct an automatic machine of the character described, which is highly efficient in the production of several types of wire products by minor changes and adjustments to the machine.

In addition to the above broader features of the invention, there are certain details of design whereby compactness, durability of structure, and positiveness and ease of operation are attained, and which details are shown on the accompanying four sheets of drawings illustrating the present embodiment of my invention, and what I claim as new, is particularly pointed out in the appended claims following this specification.

Fig. 12 is a side view of the oscillating die with a section of punched wire in position just previous to bending, the die block being shown in dot-and-dash lines.

Fig. 13 is a top view of the oscillating die and wire of Fig. 12.

Fig. 14 is a side view of the oscillating die with the wire staple formed thereby in position just previous to shearing and partial ejection therefrom, and Fig. 15 is a top view showing the staple sheared and partially ejected, and in position for complete ejection by the bolt head of the oscillating die on its return to normal position as shown in Fig. 12.

Fig. 16 is a diagrammatic illustration of one complete cycle of the machine, showing the relative angular time required for each operation to complete one staple per cycle, beginning at 0 of the indicating directional arrow.

Figure 1:
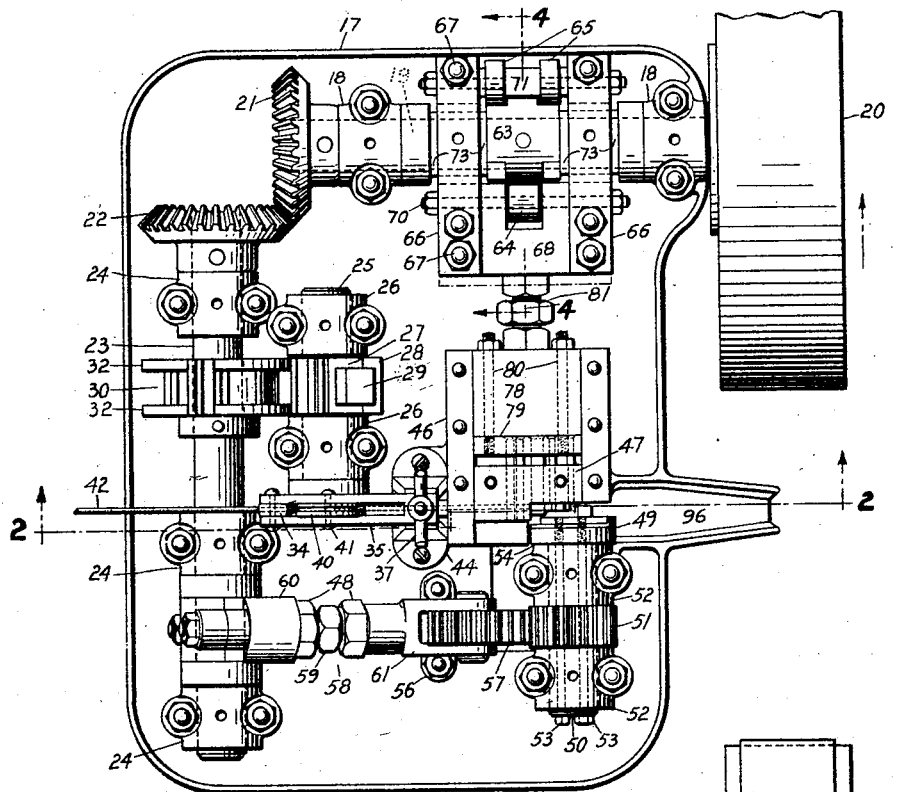
Figure 1 is a plan of an automatic machine constructed in accordance with the principles of my invention.

Adverting to the drawings and the figures thereof: My machine (Fig. 1) consists of a base plate designated by the number 17 securable to any suitable support or foundation, and has bearings 18 thereon in which the main drive shaft 19 is journalled; said shaft may be provided at one end with a suitable combined driving pulley and flywheel 20, and at the opposite end with a bevel gear 21 adapted to mesh with a similar gear 22 secured to a crank shaft 23 journalled in suitably positioned bearings 24, and which shaft extends at right angles to the drive shaft 19.

On the drive shaft 19 and between the flywheel 20 and bevel gear 21, is mounted the cam and roller drive for operating the punch and shear mechanism of the machine, and which mechanism will be later described in detail with special reference to Figs. 4 to 7 inclusive.

Figure 2:
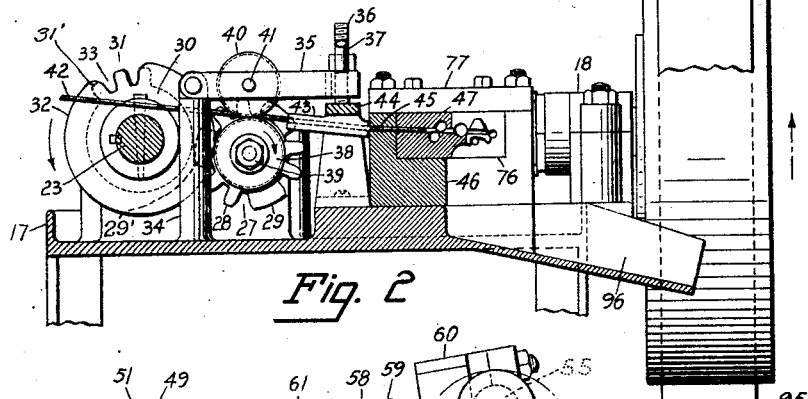
Fig. 2 is a transverse partial sectional elevation taken on the line 2—2 of Fig. 1 showing principally the wire-feeding mechanism.
Figure 8:
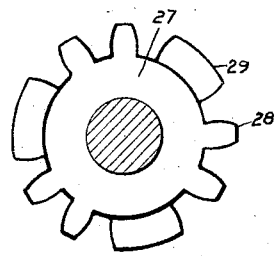
Fig. 8 is a side view of the pinion of the wire feed mechanism.
Figure 9:
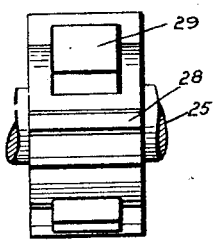
Fig. 9 is an edge view of it.

The wire feed mechanism to the machine operates from the crank shaft side thereof, and comprises a stub shaft 25 journalled in suitable bearings 26 extending from the base plate 17; said stub shaft is provided with a pinion 27 preferably made solid therewith, and having alternate sets of long and short teeth 28 and 29, respectively, (Figs. 8 and 9) adapted to mesh with and be intermittently engaged by a segmental drive gear 30 secured to the crank shaft 23. Said gear 30 is provided, in this instance, with three teeth (Fig. 2), the middle one 31 of which is of the same length as the long teeth 28 of the pinion 27 and the other two teeth of the drive gear are substantially the length of the short teeth 29 of the pinion, and the said two teeth are between the flanges 32. Said flanges are formed as part of the drive gear and concentric with the shaft and extend slightly beyond the periphery of the teeth of the gear as shown in Fig. 2. The said flanges are notched to register with the teeth as indicated at 33 to allow the free intermittent engagement therewith of the long sets of teeth 28 of the pinion 27. The said long teeth of the pinion extend across both flanges of the drive gear 30, and when out of engagement with the teeth of the latter, the circumference of said flanges slidingly contacts with a long tooth 28 of the pinion, thus holding the pinion 27 stationary for the period of contact and which is until the short tooth 31' of the drive gear 30 strikes the short heavy tooth 29' of the pinion 27, thus permitting the two adjacent long teeth 28 to mesh about the long tooth 31 of the drive gear, after which engagement the pinion assumes another period of rest. The heavy teeth are the size of two normal teeth with the portion between uncut. They are made heavy as each receives a hard driving blow to feed the supply wire periodically as will be explained later.

The post 34 (Fig. 2) is formed with the base plate 17 and extends upwardly between the shafts 23 and 25 and is provided at its upper end with a pivoted furcated tension bar 35, the free end of which is engaged by the anchored threaded bolt 36 and adjusting wing nut 37.

A grooved wire-engaging disk 38 is bolted to an outer end of the stub shaft 25 as at 39 (Fig. 2), and a similar grooved disk 40 is pivoted in the slot of the tension bar as at 41. The disks 38 and 40 are positioned vertically and the grooves thereof register and are provided with serrations adapted to grip the wire 42 which extends therebetween and is fed from a reel or the like (not shown).

The wire 42 which is preferably of galvanized material and suitable gauge, extends into a guide way 43 (Fig. 2) integral with the bracket 44, secured to the base plate, and thence into the bore 45 formed in the guide block 46 and die block 47 and across the front face of the latter (Fig. 10), in position to be engaged by the oscillating bending and shaping die 49 (Fig. 12). The shaft 50 for the latter (Fig. 1) is of stub formation and has a pinion 51 made solid therewith. The said shaft is suitably supported in bearings 52 which may be formed integral with the base plate 17, the pinion thereof being disposed between the said bearings. The shaft has a pair of longitudinal holes therethrough for the reception of stud bolts 53 which latter are screwed into the oscillating die 49 for holding the same on the end of the shaft as at 54, Fig. 1.

To the base plate and in alignment with the above pinion 51 is secured a jawed bracket 56 to pivotally receive and support a gear quadrant 57, the teeth of which are adapted to mesh with those of the said pinion 51.

Figure 3:
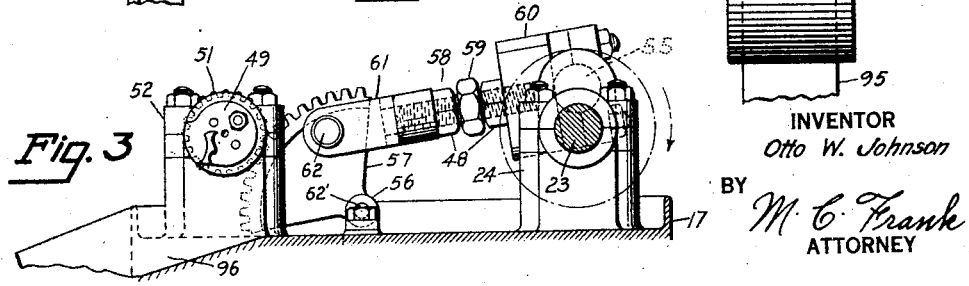
Fig. 3 is a transverse elevation taken substantially on the same line as that of Fig. 2 but looking in the opposite direction to that of the arrows, and shows primarily the bending and shaping die and the mechanism for actuating it.
Figures 4, 6:
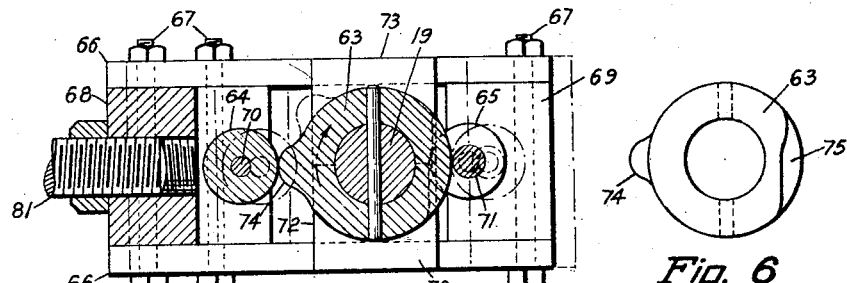
Fig. 4 is a vertical section on the line 4—4 of Fig. 1, showing the cam and roller drive assembly for the punch or tool carrying block.
Fig. 6 is a side view of the drive cam of Fig. 4.

The crank shaft 23 (Figs. 1 and 3) has a crank 55 formed thereon positioned in alignment with the oscillating pinion 51 and its meshed quadrant 57. 58 is an adjustable connecting rod linking the said crank 55 and quadrant 57 together to impart a rocking motion to the quadrant by reason of the latter being doubly pivoted as at 62 and 62' and which motion imparts an oscillatory motion to the pinion 51. The connecting rod is made adjustable to ultimately vary the angle of oscillation of the bending and shaping die 49 for the manufacture of different wire products. The said connecting rod is composed of the solid adjusting screw 59 having right and left hand threaded ends engaging, respectively, the usual crank bearing 60 at one end and the quadrant clevis member 61 at the other end. 48 are lock nuts for the final binding of the determined length of the connecting rod.

The punch and shear mechanism of the machine operating from the drive shaft 19, comprises a double acting cam 63, pinned to the said drive shaft (Fig. 4), adapted to alternately engage oppositely disposed rollers 64 and 65 mounted in the cam cross-head. The cam cross-head consists of upper and lower side bars 66, embracing therebetween by through bolts 67, end members 68 and 69 respectively. Member 68 is vertically slotted midway thereof to receive the loose roller 64 mounted on the horizontally positioned bolt 70. The other member 69 consists of two parts, supporting therebetween a horizontally positioned turned and stepped bolt 71, serving as a shaft for the loose return rollers 65 positioned thereon and apart. 72 are brasses positioned on the shaft 19, and between their flanges 73 are embraced the above bars 66, the whole being a unit adapted to move to and fro as indicated by the dot-and-dash lines of Figs. 1 and 4.

When the shaft 19 is turned (Fig. 4) in the direction of the arrow, the roller 64 is engaged by the projection 74 of the cam 63 on the forward movement and the rollers 65 idle in the cut-away portions 75 of said cam, and upon further turning of the shaft, projection 74 is disengaged and the opposite outer surfaces of the cam engage the rollers 65 and draw the cross-head to the reverse dot-and-dash line position.

The opposite end of the punch and shear mechanism has a guide block 46 connected to the base plate and is provided with a rectangular guide way 76 therethrough, which may be covered by a cap 77 (Fig. 2). The punch block thereof is in the form of a cross-head and comprises a member 78 and a punch holder 79 secured together by studs 80 (Fig. 5) and is adapted to reciprocate in the said guide way. This cross-head is connected to the above cam cross-head by means of the adjusting screw 81 similar to the previous mentioned adjusting screw 59 in Fig. 3 and is for a similar purpose. The punch or tool carrying block unit carries the shearing punch 82, notching punches 83 and ejector punches 84 suitably secured therein.

Figures 5, 7:
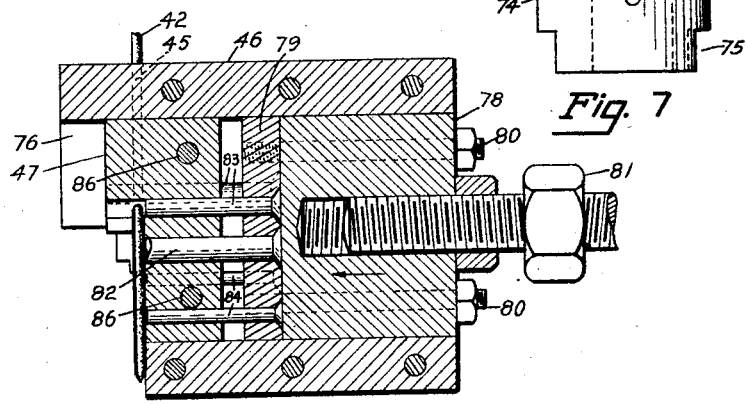
Fig. 5 is a horizontal section through the punch or tool carrying block and associated parts.
Fig. 7 is a top view of it.
Figure 10:
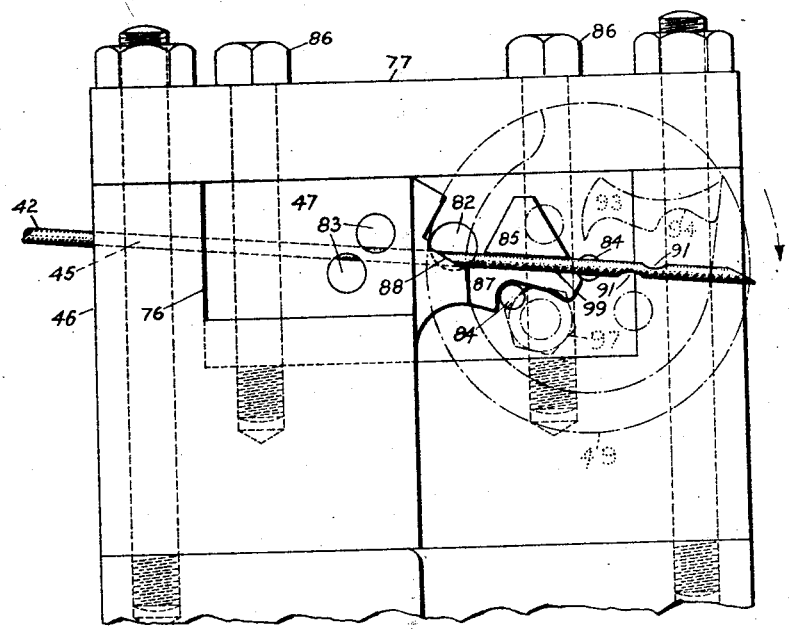
Fig. 10 is a face view of the die block and supporting frame therefor with a section of wire in position after it has been notched or punched. The dot-and-dash lines represent the oscillating bending and shaping die in relative position and ready to perform its operation.
Figure 11:
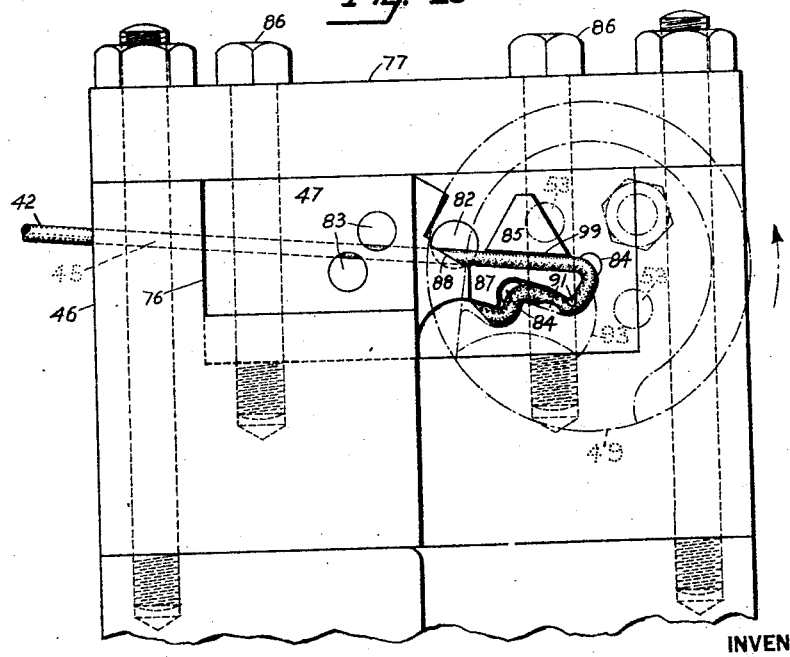
Fig. 11 is a face view analogous to Fig. 10 showing the wire in the die after the completion of the bending and shaping operation, the oscillating die having travelled to the limit of its oscillation and ready to reverse as indicated by the arrow.

47 is the previously mentioned die block of the punching and shearing mechanism, and is of a size to be rigidly and stationarily engaged in the guide block 46 by the fitted bolts 86 (Figs. 5 and 10). The block has registering holes therein for the punching elements of its adjacent punch block cross-head. The face of the die block (Figs. 10 and 11) is provided with a retaining lug 85 and a forming lug 87 thereunder. Between the lugs and in alignment with the bore 45 through the block, is a groove 99 to receive the fed wire 42. A shearing face 88 is adjacent these lugs and is positioned in the path of the shearing punch 82 and coacts therewith in the shearing of the wire to proper length, and forms the point 89 of the sheared staple 90 as shown in Fig. 15. The notching punches 83 are disposed on opposite sides of the wire and punch the notches 91 (Figs 10 and 11) to form the weakened portions of the staple as described in my co-pending application.

The bending and shaping die 49 secured to the shaft 50 aforesaid, is positioned to operate in close proximity to the die block as shown in the various figures, and comprises a circular head having an extension 92 upon which a bending and shaping lug 93 is formed; said lug is provided with a contacting edge 94 similar in contour to that of the forming lug 87 and to which it is adapted to nest when oscillated to engage the wire section positioned therebefore to form the staple 90, the finished product in this embodiment of my invention.

The operation of the machine is as follows: When power is applied to the drive pulley 20 by means of the belt 95 or other source, the drive shaft 19 is rotated, which in turn drives the crank shaft 23. Attached drive gear 30 on the latter shaft continuously revolves and by its three-tooth formation is adapted to intermittently turn pinion 27 and wire engaging disk 38 through a limited angle to feed and deliver a predetermined length of wire to the stationary die block 47. The rotation of the drive shaft 19 causes the double acting cam 63 to reciprocate the punch block 79 to and from the stationary die block 47, causing the shearing, notching and ejector punches to operate in the corresponding bores in the stationary die block 47 and cross the path of the wire 42 extending through the die block and in front of the punches.

The notches 91 are formed by the notching punches 83, and the wire is simultaneously sheared by the shearing punch 82 and ejected forwardly by the ejector punches 84.

The bending and shaping die 49 is timed to operate immediately after the feeding operation, and the bending and shaping lug 93 thereof contacts the protruding wire in the stationary die block and bends and shapes it against the under face of the forming lug 87. The initial position of the wire is shown in Figs. 10, 12 and 13, and the final position in Figs. 11, 14 and 15. The said die 49 turns in a contra-clockwise direction in bending as shown by the arrows in the said figures, and in a clockwise direction upon returning to initial position, and substantially completes a half cycle in this oscillatory movement.

The ejector punches 84 (Fig. 15) operate simultaneously with the notching punches and shearing punch as aforesaid, and force the staple from the stationary die 47 at two points, and said staple which is now completed may drop by gravity into the chute 96 formed therebelow in the base plate, but as a precautionary measure in the event the finished staple might stick or not clear, I have provided a tap bolt 97 on the oscillating die 49 to forcefully, on its return movement (Fig. 15), contact and complete the ejection of the staple.

The completed staple comprises, a straight shank member and a bent one as indicated (Fig. 14). The latter member extends downwardly and terminates in a point or toe 89, having an adjacent heel 98. The notches 91 formed on the bent shank tend to weaken the member at these points, so that when the staple in use is hooked over the wire netting in building construction and driven into the sheathing, the said notches will give or collapse by virtue of the resistance offered by the heel 98 contacting and bearing against the said sheathing, and will bind and hold the wire netting in position spaced from the sheathing.

What I claim and desire to secure by Letters Patent of the United States, is the following:

1. The combination in a wire products forming machine, of a frame having drive and crank shaft units and a gear quadrant connected thereto, means carried by said crank shaft to rock the quadrant, a die adapted to be oscillated by said quadrant, a stationary die block and a punch block, and means carried by said drive shaft to reciprocate said punch block, the latter coacting with said die block and oscillating die in the formation of the wire product.

2. The combination in a wire products forming machine, of a frame having drive and crank shaft units and a gear quadrant connected thereto, means carried by said crank shaft to rock the quadrant, a die adapted to be oscillated by said quadrant, a stationary die block and a punch block, and means carried by said drive shaft to reciprocate said punch block, the latter coacting with said die block and oscillating die in the formation of the wire product, the said quadrant rocking means being adjustable.

3. The combination in a wire products forming machine, of a frame having drive and crank shaft units and a gear quadrant connected thereto, means carried by said crank shaft to rock the quadrant, a die adapted to be oscillated by said quadrant, a stationary die block and a punch block, and means carried by said drive shaft to reciprocate said punch block, the latter coacting with said die block and oscillating die in the formation of the wire product, the said reciprocating means being adjustable.

4. The combination in a wire products forming machine, of a frame having drive and crank shaft units and a gear quadrant connected thereto, means carried by said crank shaft to rock the quadrant, a die adapted to be oscillated by said quadrant, a stationary die block and a punch block, and means carried by said drive shaft to reciprocate said punch block, the latter coacting with said die block and oscillating die in the formation of the wire product, the said quadrant rocking means and reciprocating means being adjustable.

5. In a wire products forming machine, a drive shaft and a crank shaft driven thereby, a die adapted for connection with said crank shaft, a stationary die block positioned to face and function with said die, a punch block to the rear and in alignment with said die block and adapted to coact therewith and with said die, and connecting means on said shafts to alternately oscillate and reciprocate said die and punch block respectively on opposite sides of said stationary die block.

6. In a wire products forming machine, a drive shaft and driven shaft, a die connected with said driven shaft, a stationary die block facing said die and a punch block facing the other side of said die block, and means to alternately reciprocate said punch block in said die block and oscillate said die respectively; the adjacent faces of said die and die block having oppositely disposed wire engaging elements.

7. In a wire products forming machine, a drive shaft and driven shaft, a die connected with said driven shaft, a stationary die block facing said die and a punch block facing the other side of said die block, and means to alternately reciprocate said punch block in said die block and oscillate said die respectively; the adjacent faces of said die and die block having oppositely disposed wire engaging elements, and the said driven shaft provided with means to feed a predetermined length of wire between said oppositely disposed wire engaging elements.

8. A wire products forming machine comprising, a drive shaft and a driven shaft, a die connected with said driven shaft and oscillated thereby, a stationary die block adjacent and opposed to said die and adapted to cooperate therewith, a punch block adapted to reciprocate in said die block, means for reciprocating said punch block, and means for feeding a predetermined length of wire to and between said oscillating die and opposed stationary die block.

9. In a wire products forming machine, the combination with a driving unit, of a wire feed mechanism, a movable die and a stationary die adapted to coact therewith, a punch block carrying shearing and punching elements and adapted to coact with said dies, means for intermittently operating said wire feed mechanism to deliver a predetermined length of wire to the dies, means for oscillating said movable die to bend and shape said length of wire, and means for reciprocating the punch block to shear the finished wire product.

10. In a wire products forming machine the combination with a stationary die having forming elements thereon, of an intermittent wire feed mechanism adapted to deliver a predetermined length of wire to said die, a punch block having shearing and punching elements adapted to reciprocate in said die and engage said length of wire, a movable die positioned to intercept said length of wire to bend and shape the same against the forming elements of said stationary die, means for operating said movable die, and means for reciprocating said punch block to shear the formed wire product.

11. In a wire products forming machine, the combination of a stationary die block having forming elements, a punch block having shearing and notching elements adapted to reciprocate in said die block, a movable die having a wire bending element, a wire feed mechanism adapted to deliver a predetermined length of wire to said die block, and means timed for operating said movable die and punch block to bend and shear said length of wire and notch an adjacent section of wire.

12. In a wire products forming machine, the combination of a driving unit, a wire feed mechanism connected therewith, a stationary die block, a punch block adjacent the die block and adapted to reciprocate therein, a die adjacent the opposite side of said die block and adapted to coact therewith, and means in connection with said driving unit to intermittently operate the feed mechanism, the die and the punch block in consecutive timed relation.

13. A wire products forming machine comprising, a driving unit, a stationary die block, a die opposed to said die block and adapted to operate thereon, a punch block carrying projecting shearing and punching tools and having a double acting cam mechanism in connection with the driving unit adapted to reciprocate said tools in the stationary die block at timed intervals for shearing and punching, means for intermittently feeding a section of wire to the die block, and means for operating said die on the wire section to bend the same over the die block previous to shearing.

14. A wire products forming machine comprising, a driving unit, a stationary die block having wire engaging and forming elements projecting from a face thereof, a tool block carrying shearing, ejecting and notching punches adapted to reciprocate with relation to said die block, means in connection with the driving unit to reciprocate said tool block, a die connected with said driving unit by an oscillatory connection and having a bending and shaping element projecting from a face thereof and adapted to coact with the said projecting die block elements, means for feeding a section of wire to said die block and die, and operating means timed to feed, bend, shear and eject said section of wire and simultaneously notch the adjoining section of wire.

15. A wire products forming machine comprising, a driving unit, a single stationary die block, a single reciprocatory tool block adapted to operate in said die block, a single die opposite the die block and adapted to co-operate with said die block and tool block, means for imparting oscillatory movement to said die, means for feeding a predetermined section of wire to the die, and adjustable means for timing the successive operations of the oscillating die and reciprocating tool block on the said section of wire in the formation of the completed wire product.

In testimony whereof I affix my signature.

OTTO W. JOHNSON.